US008050982B2

(12) United States Patent  (10) Patent No.: US 8,050,982 B2
Lin  (45) Date of Patent: Nov. 1, 2011

(54) SYSTEMS AND METHODS FOR TRANSACTING BUSINESS OVER A GLOBAL COMMUNICATIONS NETWORK SUCH AS THE INTERNET

(75) Inventor: Wayne W. Lin, Irvine, CA (US)

(73) Assignee: Priceplay, Inc., Irvine, CA (US)

( * ) Notice: Subject to any disclaimer, the term of this patent is extended or adjusted under 35 U.S.C. 154(b) by 1726 days.

(21) Appl. No.: 11/262,527

(22) Filed: Oct. 28, 2005

(65) Prior Publication Data

US 2006/0059055 A1  Mar. 16, 2006

Related U.S. Application Data

(63) Continuation-in-part of application No. 09/342,866, filed on Jun. 29, 1999, now Pat. No. 6,978,253.

(51) Int. Cl.
*G06Q 30/00* (2006.01)
(52) U.S. Cl. .................... 705/26.3; 705/26.2; 705/26.35
(58) Field of Classification Search .................... 705/26, 705/27, 26.2–27.1
See application file for complete search history.

(56) References Cited

U.S. PATENT DOCUMENTS

| | | |
|---|---|---|
| 3,718,906 A | 2/1973 | Lightner |
| 4,040,629 A | 8/1977 | Kelly |
| 4,501,422 A | 2/1985 | Leshik |
| 4,764,666 A | 8/1988 | Bergeron |
| 4,799,156 A | 1/1989 | Shavit et al. |
| 4,850,007 A | 7/1989 | Marino et al. |
| 4,869,500 A | 9/1989 | Williams |
| 5,085,435 A | 2/1992 | Rossides |
| 5,269,521 A | 12/1993 | Rossides |
| 5,537,314 A | 7/1996 | Kanter |
| 5,620,182 A | 4/1997 | Rossides |
| 5,710,887 A | 1/1998 | Chelliah et al. |
| 5,715,314 A | 2/1998 | Payne et al. |
| 5,721,827 A | 2/1998 | Logan et al. |
| 5,724,521 A | 3/1998 | Dedrick |
| 5,752,238 A | 5/1998 | Dedrick |
| 5,779,549 A | 7/1998 | Walker et al. |
| 5,794,207 A | 8/1998 | Walker et al. |

(Continued)

OTHER PUBLICATIONS

"e-commerce in its second wave Return hits harder Series: Special report on emerging electronic market;" Geof Wheelwright. National Post. Don Mills, Ont.: Jan. 27, 1999. p. E.02. Retrieved via ProQuest on Aug. 15, 2011.*

(Continued)

*Primary Examiner* — Michael Misiaszek
(74) *Attorney, Agent, or Firm* — Westerman, Hattori, Daniels & Adrian, LLP

(57) ABSTRACT

A business process is described for conducting business transactions over the Internet, allowing buyers an opportunity to reduce the price of a product/service based on the buyer's performance during a Price-Determining-Activity (PDA). Sellers offer the product/service within a specified price range, and buyers agree to a binding agreement, in exchange for the opportunity to close the transaction at the lowest price by achieving a high score or performance during the PDA. The price may change during the PDA, and the available price at any given time may be displayed or otherwise made available to the buyer. The price change may be continuous, at intervals, in response to certain events. The PDA may be a video game, electronic board game, sports bet, card game, or any other activity, or against the seller, a software opponent, or a computer opponent. The PDA may involve another buyer competing for the same product/service.

12 Claims, 2 Drawing Sheets

U.S. PATENT DOCUMENTS

| | | | |
|---|---|---|---|
| 5,794,219 | A | 8/1998 | Brown |
| 5,816,918 | A | 10/1998 | Kelly et al. |
| 5,822,216 | A | 10/1998 | Satchell, Jr. et al. |
| 5,823,879 | A | 10/1998 | Goldberg et al. |
| 5,835,896 | A | 11/1998 | Fisher et al. |
| 5,855,008 | A | 12/1998 | Goldhaber et al. |
| 5,882,258 | A | 3/1999 | Kelly et al. |
| 5,890,718 | A | 4/1999 | Byon |
| 5,916,024 | A | 6/1999 | Von Kohorn |
| 5,966,699 | A | 10/1999 | Zandi |
| 5,970,469 | A | 10/1999 | Scroggie et al. |
| 5,974,398 | A | 10/1999 | Hanson et al. |
| 5,974,399 | A | 10/1999 | Giuliani et al. |
| 5,991,740 | A | 11/1999 | Messer |
| 6,048,268 | A | 4/2000 | Humble |
| 6,057,872 | A | 5/2000 | Candelore |
| 6,061,660 | A | 5/2000 | Eggleston et al. |
| 6,064,981 | A | 5/2000 | Barni et al. |
| 6,078,906 | A * | 6/2000 | Huberman .................. 705/37 |
| 6,101,484 | A | 8/2000 | Halbert et al. |
| 6,151,589 | A | 11/2000 | Aggarwal et al. |
| 6,161,059 | A | 12/2000 | Tedesco et al. |
| 6,216,111 | B1 | 4/2001 | Walker et al. |
| 6,216,129 | B1 | 4/2001 | Eldering |
| 6,264,560 | B1 | 7/2001 | Goldberg et al. |
| 6,269,343 | B1 | 7/2001 | Pallakoff |
| 6,269,361 | B1 | 7/2001 | Davis et al. |
| 6,285,987 | B1 | 9/2001 | Roth et al. |
| 6,324,519 | B1 | 11/2001 | Eldering |
| 6,389,401 | B1 | 5/2002 | Kepecs |
| 6,397,197 | B1 | 5/2002 | Gindlesperger |
| 6,516,302 | B1 | 2/2003 | Deaton et al. |
| 6,578,014 | B1 | 6/2003 | Murcko, Jr. |
| 6,584,451 | B1 | 6/2003 | Shoham et al. |
| 6,604,089 | B1 | 8/2003 | Van Horn et al. |
| 6,687,679 | B1 | 2/2004 | Van Luchene et al. |
| 6,783,028 | B1 | 8/2004 | Ambrose et al. |
| 6,907,566 | B1 | 6/2005 | McElfresh et al. |
| 7,089,194 | B1 | 8/2006 | Berstis et al. |
| 7,146,330 | B1 | 12/2006 | Alon et al. |
| 7,249,085 | B1 | 7/2007 | Kinney et al. |
| 2006/0036511 | A1 | 2/2006 | Lin |

OTHER PUBLICATIONS

Asahi Shimbun, "E-Commerce That May Be Closer to Home: Key is Safe Settlement of the Bill"; newspaper article, Toyko morning edition, Jun. 22, 1996; Tokyo, Japan.

Information Access Technologies, Inc., "Make Your Web Site Profitable"; website from About Aaddzz; 96 pages; copyright 1997.

* cited by examiner

SYSTEMS AND METHODS FOR TRANSACTING BUSINESS OVER A GLOBAL COMMUNICATIONS NETWORK SUCH AS THE INTERNET

RELATED APPLICATIONS

This application is a continuation-in-part of U.S. application Ser. No. 09/342,866, filed Jun. 29, 1999, now issued as U.S. Pat. No. 6,978,253, to which priority is hereby expressly claimed.

FIELD OF THE INVENTION

The present invention relates generally to systems and methods of doing business over a global communications network such as the Internet, and more particularly to systems and methods wherein various forms of competition and/or entertainment are used to determine transaction prices between buyers and sellers.

BACKGROUND

Many businesses have recently begun expanding into e-commerce in an effort to attract some of the seemingly endless source of potential buyers. In fact, many new businesses actually offer their products and services solely via e-commerce. Some e-commerce businesses provide traditional transaction methods, wherein the seller offers a specified product at a specified price, and the buyer "buys" the product by performing a required set of tasks acknowledging the formation of a binding buy-sell contract. This occurs at Amazon.com, e.g., which began as an on-line book seller, but has recently expanded into other fields such as music and videos.

Various other business models have also emerged, apparently in an effort to attract a greater portion of the on-line market. For example, Priceline.com uses a model which allows the buyer to present a bid or offer price they wish to pay for a product or service, and a seller then accepts the buyer's offer to enter into a binding contract, typically as the result of a reverse auction process. See, e.g., U.S. Pat. No. 5,794,207, the contents of which are hereby incorporated herein by reference. VerticalNet.com uses a model which allows businesses to find information regarding manufacturers of specific products, after which time the business (buyer) then contacts the manufacturer directly to purchase the products. Onsale.com and eBay.com use auction models allowing sellers to submit their products to an electronic auction, which buyers then bid on electronically. Onsale.com has also announced an "at-cost" program, claiming to sell various computer and other electronic products at wholesale cost. Other e-commerce companies simply use their websites as an advertising activity to promote their products.

These various e-commerce business models all have certain advantages and disadvantages, but as a fundamental principle of a free market economy such as in the United States, their common goal likely is to attract as many customers as possible, to ultimately lead to more transactions and hence more profit for the companies employing the models. As such, they all seem to focus in one way or another on factors typically considered important by potential buyers—namely price and convenience. None of them, however, allow a potential buyer to engage in a competitive/entertaining collateral price-determining activity (PDA) which ultimately determines the price of the product or service to be secured, depending on the buyer's performance during the collateral activity.

Off-line sweepstakes systems are also known, which allow a game player to win cash or other prizes or credits depending on the player's performance of a specified set of tasks. A simple example involves a player scratching off one of a number of covered areas on a card, to reveal a prize. However, such systems typically do not bind the player to a contract, but merely provide an offer to the player/buyer to enter into a contract on the specified terms.

Systems and methods are thus desirable to allow a potential buyer to engage in competitive/entertaining activities wherein the activities ultimately determine the price of the product or service to be bought, depending on the buyer's performance while participating in the PDA. Such systems and methods using a global communications network such as the Internet would provide buyers and sellers an alternative method of conducting e-commerce.

SUMMARY OF THE INVENTION

The present invention comprises a business model used to determine the price of goods and/or services to be provided from a seller or sellers to a buyer or buyers. Various forms of electronic competition and/or entertainment are used as intermediary activities between said buyers and sellers to ultimately determine a contract price. Sellers offer a product or service within a specified price range, and buyers enter into a contract to buy the product or service within that price range. The ultimate price (within the range) is determined based upon the buyer's performance rating, or score, which the buyer receives from participating in a collateral activity. Thus, e.g., if a buyer performs poorly at the activity, the price will be higher, whereas if the buyer does well, the price will be lower. The activity may be a video game (including audio/visual games), electronic board game, crossword puzzle or other word game, sports bet, card game, or any other activity or combination of activities, and may be performed against the seller, a pre-programmed software opponent, a computer opponent, another buyer competing for the same or a different product, a player participating as a player only and not as a buyer, or anyone or anything else. The actual range may be a scaled set of prices (e.g., $1000.00, $1100.00, $1200.00, etc.), or it may be simply a single price, such as a discounted price, for which the buyer will either "win" the contract or "lose", and not be entitled to the product at the specified price, or it may even include a lower boundary of $0.00, such that the product or service might be attainable for free if the buyer can achieve a certain performance level while participating in the PDA.

The price at any specific point in time may vary, depending on the buyer's score or performance rating at that time. This may occur even if the PDA has not been completed. Furthermore, that specific price may be displayed or made available to the buyer during performance of the PDA, either upon request, continuously, at intervals, or in response to the occurrence of certain events. Thus, a buyer may see the price changing dynamically throughout performance of the PDA, increasing and/or decreasing as the performance varies. There may also be provided to the buyer, similar dynamic information related to other participants. The display may be accompanied by audio, visual, and/or audio-visual clips, and may be displayed as a ticker, a box score, a picture-in-picture, or in any other manner.

Sellers are able to attract buyers using the marketing incentive that buyers can reduce the price of the offered product or service by performing well at the specified activity. Sellers are willing to put forth the initial offer of a certain price range, in hopes that the average price of the product over time will be a profitable price within the range, based upon the average performance of potential buyers that is expected to occur.

Buyers, on the other hand, are willing to accept the possibility of paying the highest price within the range, in exchange for the opportunity to pay the lowest price (or any lower price) within the range if they can achieve a certain level of performance at the specified activity. Buyers also receive a side benefit of the entertainment value of the activity, during which they are attempting to lower the price of a product or service. Additionally, it is typically exciting for a buyer to see the price of a product or service dropping dynamically in relation to performance at the collateral activity.

Thus, one aspect of the present invention involves a method of doing business over a global communications network comprising the steps of: communicating to a buyer via the global communications network, a description of a product; accepting a first request from the buyer to buy the product for a price to be determined within a price range; accepting a second request from the buyer to allow the price to be determined based upon a performance of the buyer while participating in a Price-Determining-Activity (PDA) selected by the buyer; receiving data from the buyer over the global communications network, said data representing the performance of the buyer during the selected PDA; and determining the price of the product based at least partially upon the data received, said price being within the price range.

Another aspect of the present invention involves a method of determining a price of a product using a global communications network, comprising the steps: communicating to a buyer via the global communications network, data representing a plurality of products available, said plurality of products including a first product; accepting acknowledgement from the buyer representing an intent of the buyer to buy the first product at a price to be determined based upon a performance of the buyer while participating in a Price-Determining-Activity (PDA), said acknowledgement being communicated over the global communications network; determining the performance of the buyer; and assigning a price to the product, said price being dependent upon the performance of the buyer.

Another aspect of the present invention involves a system for conducting e-commerce over a global communications network, comprising: a computer server having access to the global communications network, and being programmed to communicate to a buyer via the global communications network, data representing a plurality of products, said plurality of products including a first product; and to accept acknowledgement from the buyer representing an intent of the buyer to buy the first product at a price to be determined dependent on a performance of the buyer while participating in a Price-Determining-Activity (PDA), said acknowledgement being communicated over the global communications network; and to determine the performance of the buyer based upon data received over the global communications network; and to assign a price to the product, said price being dependent upon the performance of the buyer.

Methods are thus described wherein buyers participate in selected activities, the outcomes of which are used to determine the ultimate price the buyer is to pay for a selected product or service. Other objects and advantages of the present invention will be apparent from the detailed description which follows, when read in conjunction with the associated drawings.

DETAILED DESCRIPTION OF THE INVENTION

The present invention describes business systems and business models/processes for conducting business transactions wherein the buyer and seller agree to a price range at which a transaction will take place. Sellers offer their product/service within a specified price range, and buyers accept the offer, in exchange for the opportunity to close the transaction at the lowest price offered by achieving a high score during a collateral activity. The ultimate price is within the agreed upon range, but is determined based upon the buyer's performance during the collateral PDA. The price may vary during performance of the PDA, and the price at any given point in time may be displayed or made available to the buyer or person performing the PDA. There may be predetermined or programmed activities associated with the PDA which allow the buyer to lock in a price even though the PDA might not be completed, or may have optional additional performance time available.

The activity may be a video game, electronic board game, sports bet, card game, or any other activity, and may be performed against the seller, a pre-programmed software opponent, a computer opponent, another buyer competing for the same or a different product, a player participating as a player only and not as a buyer, a predetermined achievement level, or anyone or anything else. The activity may be conducted on-line, or off-line.

Application of the present invention is especially beneficial using a global communications network such as the Internet, because the massive numbers of buyers and sellers, combined with the ability to conduct transactions across time zones, makes the Internet especially suitable for practicing the present invention. A centralized server or controller may be implemented to manage all transactions, allowing access through various front-ends such as existing Internet portals or e-commerce sites. Such control would allow for efficient management of quality control, buyer-seller qualification screening, association of PDAs with corresponding products and services, and other database and e-commerce customer service and data control issues.

Figure 1:
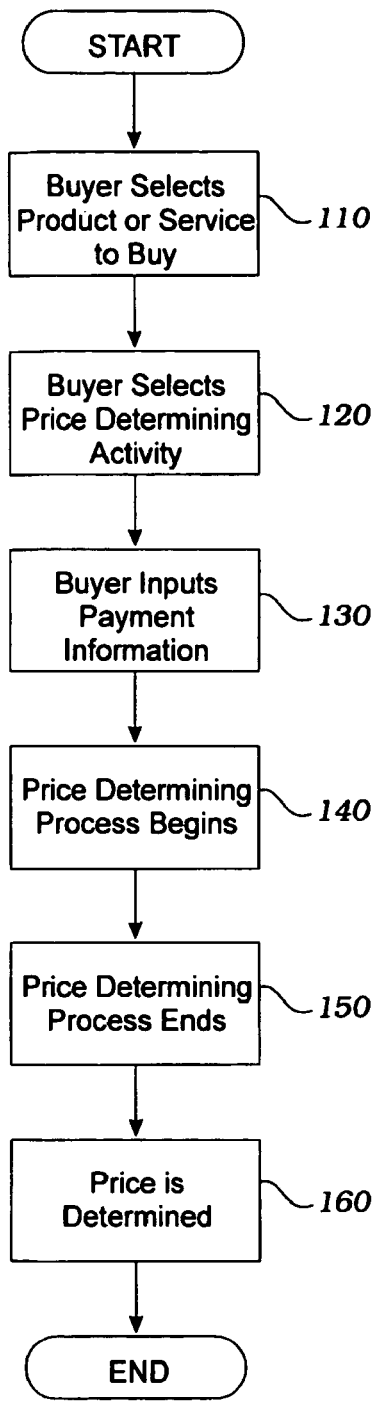
FIG. 1 is a flow-chart illustrating the steps involved in a typical transaction performed in accordance with the concepts of the present invention.

Turning to FIG. 1, a flow-chart is shown illustrating the steps involved in a typical transaction performed in accordance with the concepts of the present invention. At step 110, the buyer selects a desired product or service to be purchased. The selection may occur via a website managed by the seller or the seller's agent (e.g., a master controller), using typical selection techniques such as point-and-click, pop-up menus, etc. The website may offer the products or services as common offerings always available, auction items (e.g., like eBay.com), reverse auction items (e.g., like Priceline.com), specially-ordered lists of items (e.g., a wedding registry), or any other way. The present invention thus may be used independently of other business models, or in combination therewith, to form binding contracts. For example, using the auction or reverse auction models, the buyer may be entitled to a further discount of the auction or reverse auction price, which discount may be greater if the buyer performs well at the PDA, and not so great if the buyer performs poorly. The offerings of various products and services, and the associated PDAs, may be presented via a seller's website, or a host website acting as a front end to systems embodying the concepts described herein.

At step 120, the buyer selects a PDA from a set of those available. The available set of PDAs may be pre-set by the seller or seller's agent, and may be a subset of the actual set of activities in a PDA database. The PDAs available may vary depending upon many factors, such as the product/service being offered, the price range being offered, the quantity of products available, the demand for the product, etc. For example, a seller may allow a buyer to choose from any PDA in the PDA database, for a particular item that the seller wants to offload as a promotional item, and for which the seller is unconcerned as to the probabilities of receiving a specified average price over time for the product. On the other hand, for a popular product that is capable of commanding a full market price, the seller may wish to only allow certain PDAs to be associated with the product, where those PDAs will typically result in a higher sale price than other PDAs. The association of a particular PDA with any given product or service, any given seller, any given buyer or class of buyers, any given time period, any given source of entry to the website implementing the present invention, or to any other database, database entry, event, or other factor, or to any combination of the aforementioned, may be managed and controlled using well-known database management software.

After the buyer selects a PDA, the buyer may provide payment information, as seen at step 130. The information may be input and processed using well-known e-commerce financial software, taking advantage of integrated or independent encryption technology. Alternatively, the buyer may provide financial information via phone, regular mail, e-mail, or any other means, and may gain access to the seller's offers via a password or other secure identification method already associated with the buyer's financial information. This step, if it occurs, may occur at any stage in the process, but preferably would occur prior to allowing the buyer to participate in the PDA.

Once the buyer selects the PDA at step 120 (and preferably after the buyer provides payment info at step 130), the PDA may begin, as seen at step 140. Actual start of the PDA may require additional input from the buyer, indicating he or she is ready to begin, and/or that he or she agrees to and understands that by beginning the PDA, he or she has entered into a binding contract. The PDA may be a video game, electronic board game, gambling game, sports bet, or any other activity, and may be single-player or multi-player, and may comprise computer-executable code sent to the buyer over a global communications network such as the Internet. Various PDAs are described in more detail herein.

As the PDA is being performed, or even prior to the PDA being determined, or even after the PDA has completed, the price may be displayed or made available to the buyer. This may occur upon request, continuously, at intervals, or upon the occurrence of certain events. For example, there may be a "SHOW PRICE" button available, and that button may be always accessible, or may appear at intervals, or only upon the occurrence of certain events, such as finding a special treasure, achieving a certain point score, "killing" a certain beast, solving a certain riddle or puzzle, performing a qualifying round of the PDA, etc. Or the price may be displayed as described above, but without the need for activation of a "SHOW PRICE" button. Similarly, the price may simply continuously update as performance of the PDA continues, and audio, visual, or audiovisual indications may appear as certain price levels are achieved. There may also be provided to the buyer, similar dynamic information related to other participants.

Thus, a buyer may see the price changing dynamically throughout performance of the PDA, increasing and/or decreasing as the performance varies. at any specific point in time may vary, depending on the buyer's score or performance rating at that time. This may occur even if the PDA has not started or been completed.

Additionally, there may be price-locking options which allow the buyer to lock in a certain price before the PDA or series of PDAs is completed, or before any optional additional performance time has elapsed. The price-locking options may be available based upon predetermined or programmed activities associated with the PDA, or may be continuously available, or available at intervals, etc. For example, the current price of a product may already be at or near the lowest price available, due to a buyer's current golf score of 8 under par after 14 holes. There may be an option to allow the buyer/golfer to stop the PDA (i.e., video golf), and secure the available price. The golfer might elect to do so in this example, to avoid losing that opportunity in the event he or she shoots bogies for the last 4 holes that would result in a final price higher than that currently available.

When the PDA is complete as to the buyer (step 150), or if there is an option available to the buyer to end the PDA prematurely and the buyer elects to do so, the actual price of the product or service at issue is determined (step 160), and if the contract is binding, the transaction may then be completed. If the contract is not binding, because e.g., the buyer was given the opportunity of engaging the PDA on a "no commitment basis", then at this point the buyer is asked if he or she wants to close the transaction at the determined price.

The following example will illustrate in more detail a buyer-seller transaction occurring using the flow-chart of FIG. 1. Buyer Bobby accesses the Internet using a typical PC with browser software. Bobby sends a request though his browser to link to a website implementing the concepts described in FIG. 1. For this example, we will call the website www.pdaportal.com (No such website is known to exist at this time). Bobby navigates the website, and finds that he can buy a Mark McGwire rookie card in mint condition, if he is willing to pay anywhere between $500.00 to $$600.00. He decides to check it out, and clicks on the Mark McGwire image to proceed (step 110).

He is then presented with a pull-down menu of five different "games" (PDAs) to choose from, along with price determination rules explaining how each PDA will be used to determine the ultimate price of the McGwire card. The "games" are: 1) a bridge game where he would be dealer and North, and would be playing with three other individuals who have selected bridge as their PDA for other products offered by www.pdaportal.com; 2) a Mark McGwire trivia quiz of ten questions; 3) an offer to predict which major league baseball player will be the first to reach fifty home-runs this season; 4) a game of keno; and 5 a classic PacMan video arcade game. After browsing through each option, and learning what type of performance would be necessary from him to achieve a buying price of $500.00, he decides to go for the trivia quiz (step 120), in which he is informed that he only needs to answer 9 of 10 multiple choice questions correctly within a fifteen minute period to achieve the $500.00 price. Even if he only gets 5 out of 10 correct, he will get the card for $600.00, and he figures that isn't so bad.

He then sends his VISA card information to the pdaportal.com server (step 130), and is informed that he may begin the "game" by selecting "START", or by returning within 48 hours to pdaportal.com and entering code "MC9915432" into the "Active request?" field. He decides to go for it now, and clicks on the "START" button. The game begins (step 140). Bobby gets through the first 8 questions, and sees the price reduced $10 after each question he answered correctly. Thus, he has seen the price reduced from $600.00 to $590.00 to $580.00 to $570.00 to $560.00 to $550.00 to $540.00 to $530.00 to $520.00 respectively, after answering each of the first 8 questions correctly. He then realizes he has only nine seconds remaining. He has no time to read the next two questions, so he simply guesses "b" for both of them. The clock runs out, and the game is over (step 150). Bobby is informed that the answer to number 9 was "c", but the answer to number 10 was "b". He gets 9 answers correct, and according to the predetermined algorithm as presented to him at the start of the game, his performance locks in the price at $500.00! (Step 160). The shipping, customer service, and other e-commerce details are handled by the www.pdaportal.com software, which is well-known in the art.

Alternatively in the above example, after answering the first 8 questions correctly, Bobby could have elected to stop and lock in the $520.00 price, because the trivia game rules may have included provisions for increasing the price in response to incorrect answers. With only a few seconds remaining, Bobby may not have wanted to risk the price increasing due to incorrect answers forced by rushed guesses.

Another example to illustrate some of the concepts described herein involves a buyer performing an action video game PDA. The buyer may see the price dynamically and continuously changing as he or she continues to blast away enemy creatures. The price may be decreasing with the destruction of each additional enemy creature. After an initial price of $500.00, the buyer has reduced the available price to only $420.00. But then as one enemy fires a laser round at our buyer's video game character and hits the character's reserve ammunition belt, the belt may evaporate and the score may decrease, with the price of the product the buyer is competing for correspondingly increasing. For example, the price may increase to $430.00 at that time. The buyer then sees an enemy spacecraft land and unload several more armed enemy creatures, in response to which the buyer may decide to lock in the $430.00 price. But the buyer may not have that option available while the enemy craft is docked. Then, as soon as the enemy craft gets airborne, a flashing light appears (or reappears) and the buyer maneuvers his or her character to the light, thus activating the price-lock option. During the delay, the buyer's character was hit two more times by enemy fire, and the price was accordingly increased to $440.00. The buyer decides to buy the product for the $440.00, which is still a significant discount from the starting price of $500.00.

Figure 2:
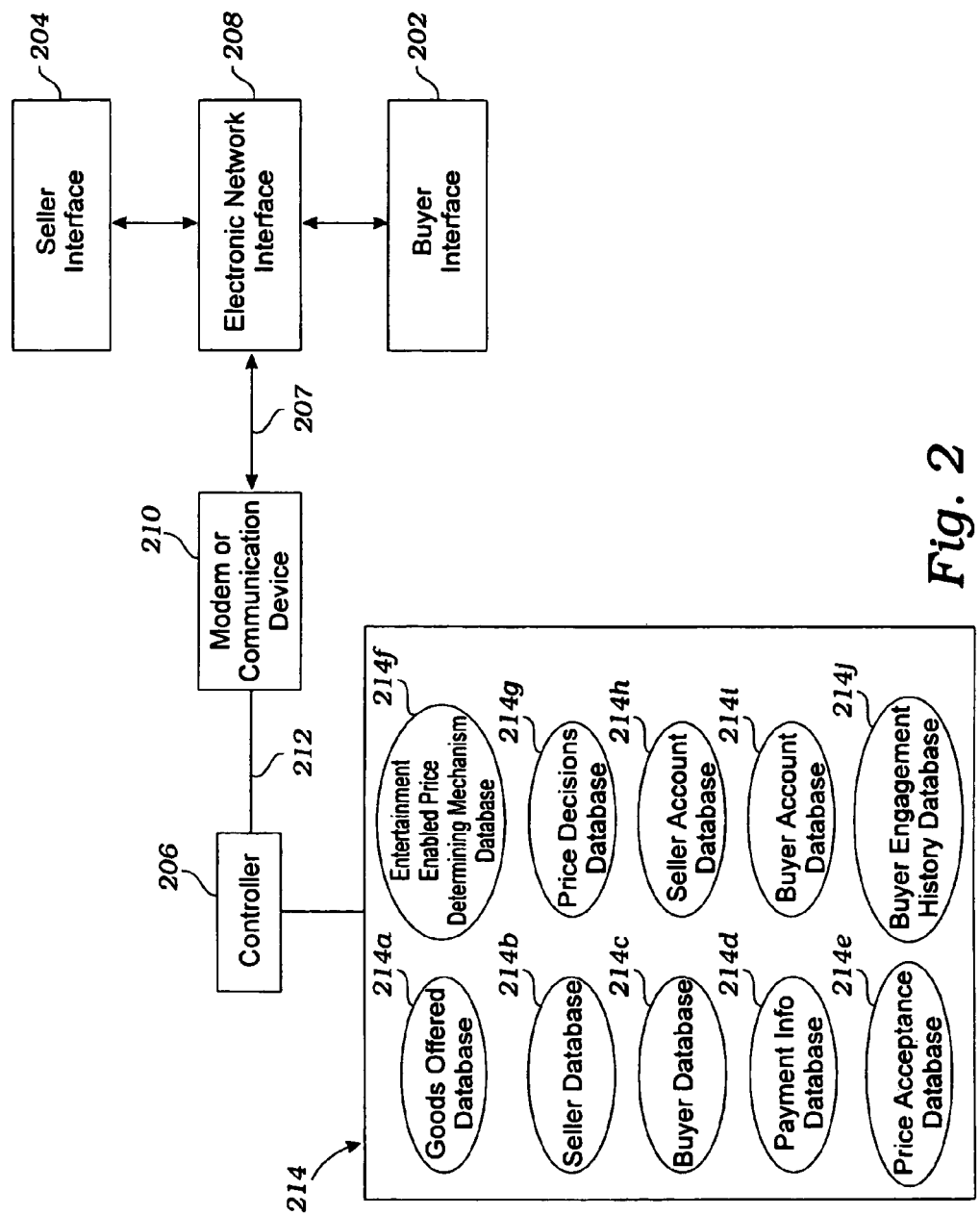
FIG. 2 is a block diagram showing an embodiment of an operation controller as used in accordance with the present invention.

As previously mentioned, the transactions may be handled by a master operation controller or content server for efficient processing and marketability. FIG. 2 is a block diagram showing one embodiment of an operation controller 206 as used in accordance with the present invention. The operation controller may be a computer server which provides content to and manages a website implementing the concepts described herein. The buyer and seller interfaces (202 and 204 respectively) may comprise a PC 216 (see FIG. 3) connected to the master operation controller 206, and may each have browser software installed. The connection may be via an electronic network interface 207 and connection 208 to a modem or other communication device 210, which in turn is connected to the content server 206 via any Internet connection 212 such as phone lines, cable lines, ISDN, T-1, etc. The network interface 208 and connection 207 is shown for simplicity to be the same for the buyer and seller interfaces 202 and 204, but this is not required, and in most instances would not be the case. Connection to the master operation controller 206 may be directly via an Internet connection 212, and may occur via a hyperlink from another website acting as a front-end to the master operation controller.

The content server 206 has access to a database 214, which may be one physical database, or multiple physical databases, as is well-known in the art. Various physical or logical databases may include the following: a goods offered database 214a, a seller database 214b, a buyer database 214c, a payment info database 214d, a price acceptance database 214e, a PDA database 214f (containing data regarding the available PDAs), a price decisions database 214g, a seller account database 214h, a buyer account database 214i, a buyer history database 214j, and many others. The relationships between the various databases 214 may be programmed using well-known programming techniques. For example, relationships may be set up as previously described to associate specified PDAs with specified products offered by specified sellers during specified time periods. The databases may be organized and partitioned in any convenient manner, and the format shown in FIG. 2 is merely an example.

Figure 3:
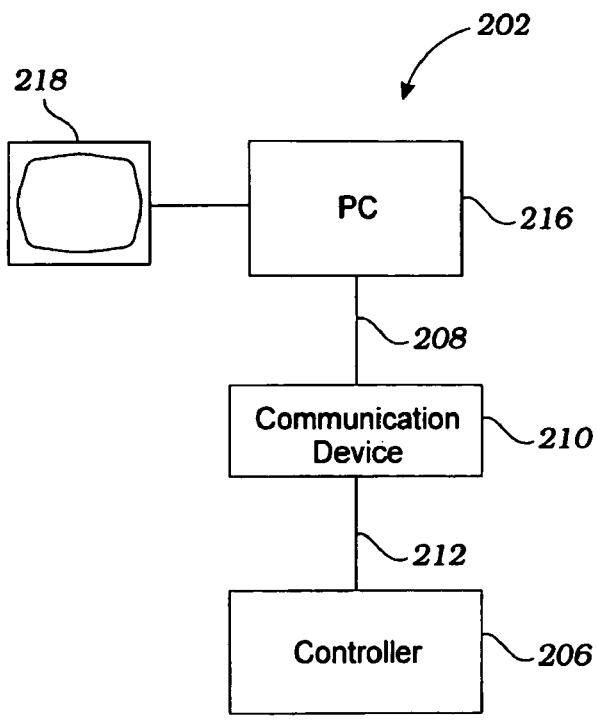
FIG. 3 is a block diagram showing one embodiment of a buyer or seller interface in accordance with the present invention.

Turning now to FIG. 3, a sample configuration of the Buyer Interface is shown. (The same configuration may be used for a Seller Interface). As can be seen, the buyer interface 202 may comprise a PC 216 connected to the master operation controller 206, and may have browser software installed. The connection may be via an electronic network connection 207 to a modem or other communication device 210, which in turn is connected to the content server 206 via any Internet connection 212 such as phone lines, cable lines, ISDN, T-1, etc. Connection to the master operation controller 206 may be directly via an Internet connection 212, and may occur via a hyperlink from another hosting website acting as a front-end to the master operation controller content. A monitor 218 or other output display device may be attached to the buyer's PC, as is well-known in the art. In an exemplary embodiment, a buyer interface 202 simply needs to have Internet access and browser software installed, to allow a buyer to navigate the Internet and access a website hosting content which implements the methods described herein. FIG. 3 is merely a simple example of such a configuration.

Turning now to the Price Determining Activities, or PDAs, the present invention contemplates a wide variety of PDAs to be used as described herein. It is to be understood, therefore, that various PDAs available, along with price determination rules explaining how the PDAs are used to determine the ultimate price of a specified product or service, may be preprogrammed and/or programmable, as needed. Thus, upon execution of a PDA in one case, a score of 100,000 may entitle the buyer to a $500.00 price, whereas the same PDA may entitle a different buyer to a price of only $525.00 for the same product.

PDAs may be added, modified, and/or deleted. The availability of any given PDA may also change and be set based upon any combination of the associated product or service offered, the identity of the seller, the time of the offer from the seller, the source of entry into the PDA's host website (e.g., special promotions may be offered to buyers accessing the PDA website through a Yahoo! link), the skill level of the buyer participant, the number of players involved in the PDA, the changing popularity of the PDA, and many other external factors. It is preferred that the price determination rules explaining how a particular PDA is used to determine the price of a given product or service, are communicated to the buyer prior to the buyer engaging the PDA. This will likely facilitate the creation of a binding contract upon the buyer. For example, opportunities to lock-in intermediate prices achieved at intermediate points during the performance of a PDA may exist in certain situations, but not in others.

A classic example of a PDA is a video game, wherein at the end of the game, the player has earned a certain point total or score. The score is then used to determine the price of the product or service at issue, in accordance with a mapping algorithm. Using the Mark McGwire card example described earlier, a score of less than 100,000 points may correspond to the $575.00 price; 100,000 to 199,999 may correspond to a $550.00 price; 200,000 to 299,999 may correspond to a $525.00 price; and a score of 300,000 or more may correlate to the lowest price available, $500.00. The various score ranges and corresponding resulting prices may of course be adjusted by the seller or seller's agent as needed. Similarly, price locking options may be available as described herein to allow a buyer to lock in a price at an intermediate point during the performance of the video game or other PDA or combination of PDAs.

Another example of a PDA involves a simulated investment in a stock market. A buyer may submit his or her prediction on the value of a certain stock, mutual fund, sample portfolio, index fund, either U.S. or foreign, at the close of a specified trading day. Or a buyer may be given a set amount of simulated "money" to "invest" in various public markets, his final portfolio value being compared to a raw score or the score of other players and/or buyers to determine the price he is entitled to pay for the specified product or service. The difference (either in percentage or raw points) between the buyer's prediction, and the actual closing price or value, may then be used to determine the price of the specified product or service.

Another example of a PDA involves sports wagering. A buyer may submit his or her wager or prediction on the outcome of a sporting event, or a combination of sporting events, or individual or team achievements during the course of a sporting event. "Odds" may be posted which correspond to the price the buyer will be entitled to depending on the accuracy of his or her wager.

Other PDAs include electronic card games, such as bridge, cribbage, black jack, poker, or other card games, craps, roulette, and electronic board games such as chess, backgammon, checkers, or a proprietary game such as Trivial Pursuit, Monopoly, or other game. It is to be understood that a price determining algorithm associated with a PDA, along with the availability of price locking options, may involve considerations of the number of players or buyers involved, the skill level of those players, market conditions for the products being sold, and other external or dynamic factors.

For example, a particular seller may have nine widgets available for sale, for which he desires to get an average of $100.00 each. He therefore configures his offer to extend to the first nine buyers interested in the widget, with a single PDA of a simulated horse race being the only PDA available. He configures the horse racing PDA to post "odds" such that three horses with the best times will receive the widget for only $75.00; numbers 4-6 will pay $100.00, and numbers 7-9 will pay $125.00, thus securing an average price of $100.00 per product for the seller.

In the horse race example, as in any multi-player situation, the simulated horse race may occur with all participants simultaneously, or it may occur at various times depending on when each buyer is available to participate. In the former case, participants may be notified by e-mail, audio or visual indicator, or any other way as to the specific start time of the multi-player PDA. For example, a player may sign-up for the race, and await at his terminal for the trumpet noise, which he would then acknowledge. The server might actually sign-up twenty or more players, and send the trumpet noise to each one until nine players have acknowledged. Once the server has received nine acknowledgements, the ten second countdown could begin and the PDA would then occur. As for the other players who did not get the trumpet call, they could remain on the trumpet call wait list until the next trumpet call. Various algorithms may be employed to remove a player from a wait list after a predetermined amount of time has elapsed. In the case of asynchronous racing, each player may engage the PDA which will be programmed to have that player's designated horse compete against the remaining horses which would be electronic opponents, as opposed to actual players.

Another application of the present invention involves a scenario wherein a buyer may participate multiple times in the same or various PDAs, in an effort to accumulate points that correspond to various price levels. For example, a Gateway 2000 computer costs may retail for $3000.00. For each certain level or accumulation of certain amounts of points, the buyer would be entitled to reduce the price of the computer. The decrease in price can be in dollar amount or percentage points, and may or may not have a bottom limit. The actual transaction price between a buyer and a seller would be determined by the buyer, when he or she decides a price has been reached to his or her acceptable level.

The actual opponents of a buyer in a multi-player PDA may even be buyers for other products or services, offered by other sellers. Or the opponent may be a pre-programmed software opponent, as in the previous asynchronous horse racing example. The opponent may even be an independent computer, as in the case when a human buyer competes against a computer opponent in a chess game. The opponent or opponents may even be people who are not buyers, but are merely players, participating in the PDA merely for the inherent entertainment value thereof.

The players and/or buyers may be required to pay a fee based on their participation in the PDA. The fee may be based upon pay-per-play, or on a predetermined time-basis such as quarterly, annual, lifetime, etc. Trial participation may be available, allowing a buyer or player/non-buyer to try the PDA for free, up to a specified number of times. Similarly, sellers may be required to pay a fee to list their products and services for sale, or they may pay a percentage of their gross or net sales, or an amount based upon number of participants, etc.

While certain embodiments are illustrated in the drawings and are described herein, including preferred embodiments, it will be apparent to those skilled in the art that the specific embodiments described herein may be modified without departing from the inventive concepts described. For example, well-known e-commerce software for order processing, order fulfillment, shipping, billing, customer service, security, general ledger, advertising, and other applications may be integrated into an overall e-commerce application package to provide a complete e-commerce solution for a business desiring to capitalize on the concepts described herein. Additionally, software implementing the concepts and methods described herein may generally be programmed to allow escape or exit at any stage, so long as the appropriate request is provided by the buyer. Also, use of the word "product" in the appended claims is intended to include both products and services. Accordingly, the invention is not to be restricted except by the claims which follow.

What is claimed is:

1. A system comprising multiple databases accessible by at least one computer server, wherein the system is programmed to perform the steps of a sales transaction, the steps comprising:
   communicating via the global communication network to a buyer;
   receiving data representing a binding commitment from the buyer via the global communication network to purchase a product for a price that will be partially based upon the buyer's participation in an auction and participation in a competitive activity that is in addition to placing bids in the auction and that is collateral to the price and associated with the product being purchased;
   wherein the competitive activity is required as part of the sales transaction; and
   using an algorithm to calculate the price of the product based at least partially upon the results of the participation of the buyer in the competitive activity and at least partially based on results of the auction; wherein the price is at least partially dependent on the outcome of the competitive activity.

2. The system of claim 1, wherein the competitive activity is a competition between at least two participants participating in the competitive activity and the auction.

3. The system of claim 2, wherein the at least two participants comprise the buyer and a second buyer, and further comprising receiving data representing a second binding commitment from the second buyer to purchase the product for a second price; the second price will be at least partially based on the competitive activity and the auction.

4. The system of claim 1, further comprising the step of receiving a bid from the buyer and a second bid from a second buyer, and the price is based at least partially on the bids received.

5. The system of claim 1, further comprising the step of paying a fee for selling the product based on revenue of the sales transaction.

6. The system of claim 1, further comprising the step of accepting payment information from the buyer over the global communications network; and the payment information is accepted after receiving the data representing the binding commitment and before the price being paid.

7. A process of performing a sales transaction comprising the steps of:
   communicating via a global communication network to a buyer;
   receiving data representing a binding commitment from the buyer via the global communication network to purchase a product for a price that will be partially based upon the buyer's participation in an auction and participation in a competitive activity that is in addition to placing bids in the auction and that is collateral to the price and associated with the product being purchased;
   wherein the competitive activity is required as part of the sales transaction; and
   using an algorithm to calculate, via an operation controller computer, the price of the product based at least partially upon the results of the participation of the buyer in the competitive activity and at least partially based on results of the auction; wherein the price is at least partially dependent on the outcome of the competitive activity.

8. The process of claim 7, wherein the competitive activity is a competition between at least two participants participating in the competitive activity and the auction.

9. The process of claim 8, wherein the at least two participants comprise the buyer and a second buyer, and further comprising receiving data representing a second binding commitment from the second buyer to purchase the product for a second price; the second price will be at least partially based on the competitive activity and the auction.

10. The process of claim 7, further comprising the step of receiving a bid from the buyer and a second bid from a second buyer, and the price is based at least partially on the bids received.

11. The process of claim 7, further comprising the step of paying a fee for selling the product based on the revenue of the sales transaction.

12. The process of claim 7, further comprising the step of, accepting payment information from the buyer over the global communications network; and the payment information is accepted after receiving the data representing the binding commitment and before the price being paid.

* * * * *